(12) United States Patent
Mamié

(10) Patent No.: US 7,950,629 B2
(45) Date of Patent: May 31, 2011

(54) TENSIONING RATCHET FOR TAUTENING AND HOLDING TENSIONING MEANS

(75) Inventor: André Mamié, Horgen (CH)

(73) Assignee: SpanSet Inter AG, Oetwil am See (CH)

( * ) Notice: Subject to any disclaimer, the term of this patent is extended or adjusted under 35 U.S.C. 154(b) by 685 days.

(21) Appl. No.: 11/994,773

(22) PCT Filed: Jul. 4, 2006

(86) PCT No.: PCT/EP2006/063847
§ 371 (c)(1),
(2), (4) Date: May 15, 2008

(87) PCT Pub. No.: WO2007/003636
PCT Pub. Date: Jan. 11, 2007

(65) Prior Publication Data
US 2008/0216294 A1 Sep. 11, 2008

(30) Foreign Application Priority Data
Jul. 5, 2005 (DE) .......................... 10 2005 031 735

(51) Int. Cl.
*B21F 9/00* (2006.01)
(52) U.S. Cl. ..... 254/225; 254/214; 24/70 ST; 24/71 ST; 24/69 CT; 24/69 ST
(58) Field of Classification Search .................. 254/214, 254/215, 217, 218, 221, 225; 24/69 ST, 69 CT, 24/70 ST, 71 ST
See application file for complete search history.

(56) References Cited

U.S. PATENT DOCUMENTS

| 6,648,301 | B2 * | 11/2003 | Lee | 254/218 |
| 6,808,164 | B2 * | 10/2004 | Chang | 254/217 |
| 7,584,940 | B2 * | 9/2009 | Gee | 254/238 |
| 2003/0071251 | A1 * | 4/2003 | Hu | 254/218 |
| 2003/0146424 | A1 | 8/2003 | Lee | 254/237 |
| 2004/0104380 | A1 * | 6/2004 | Huang | 254/218 |
| 2006/0197072 | A1 * | 9/2006 | Huang | 254/217 |
| 2010/0295004 | A1 * | 11/2010 | Huang | 254/218 |

FOREIGN PATENT DOCUMENTS
DE 296 07 275 U1 7/1996
WO WO 97/39915 10/1997

OTHER PUBLICATIONS
International Search Report for PCT/EP2006/063847.

* cited by examiner

Primary Examiner — Emmanuel M Marcelo
(74) Attorney, Agent, or Firm — Proskauer Rose LLP

(57) ABSTRACT

A tensioning ratchet for tautening and holding tensioning means, such as webbings, extruded straps, ropes, chains and the like, includes a console, with a winding-on shaft, rotatably mounted in the console, which is formed by at least two direction reversal bars, delimiting a distance between one another, and with a tensioning lever for turning the winding-on shaft about an axis of rotation. The tensioning ratchet according to the invention withstands a higher load and enables high pre-tensioning forces to be applied while preventing inadmissible stress on the user. This is achieved by the fact that the position at least of the outer circumferential face of the direction reversal bars coming into contact with the tensioning means, is variable.

19 Claims, 5 Drawing Sheets

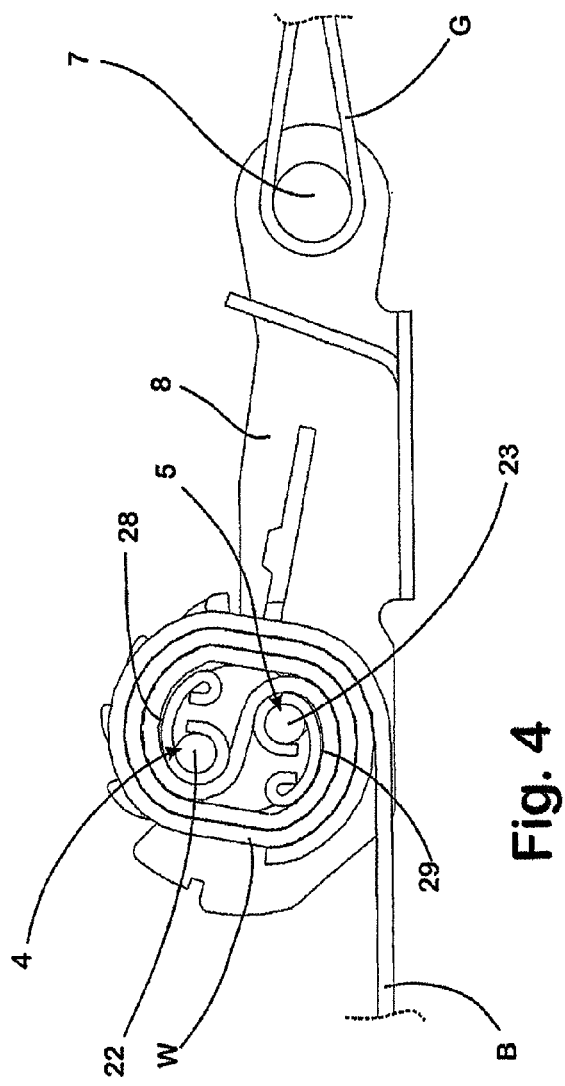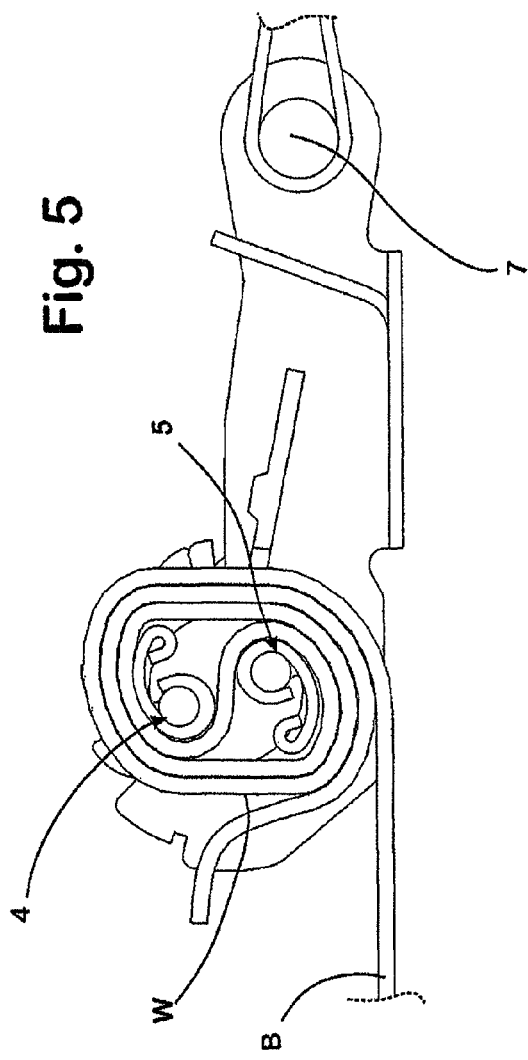

TENSIONING RATCHET FOR TAUTENING AND HOLDING TENSIONING MEANS

CROSS-REFERENCE TO RELATED APPLICATIONS

This application is a National Phase Application of International Application No. PCT/EP2006/063847, filed on Jul. 4, 2006, which claims the benefit of and priority to German patent application no. DE 10 2005 031 735.9-15, filed Jul. 5, 2005, which is owned by the assignee of the instant application. The disclosure of each of the above applications is incorporated herein by reference in their entirety.

FIELD OF THE INVENTION

The invention relates to a tensioning ratchet for tautening and holding tensioning means, such as webbings, extruded straps, ropes, chains and the like. In particular, the tautening and holding tensioning means includes a console, with a winding-on shaft rotatably mounted in the console, which is formed by at least two direction reversal bars, delimiting a distance between one another, with a tensioning lever for turning the winding-on shaft about an axis of rotation and with a lock mechanism to lock the winding-on shaft in a turning position. Tensioning ratchets of this type are used, for example, when securing cargo in order to apply the high tensile forces, necessary for the safe retention of the cargo, on the tensioning means used to secure the cargo.

In practical use, for this purpose the console is coupled by means of a suitable retaining element to an attachment point, while the tensioning means placed in each case with one end section around the cargo, is inserted through the gap existing between the direction reversal bars. When the winding-on shaft formed by the direction reversal bars is subsequently turned, the end section concerned is pulled along by the direction reversal bars and rolled up on the winding-on shaft to a multi-layer coil. Size and shape of the coil in this case are determined by the position and shape of the circumferential faces of the direction reversal bars.

BACKGROUND

Typical examples of tensioning ratchets are described in European Patent EP 0 455 085 B1, U.S. Pat. 5,282,296 or German Patent 296 07 275 U1. In the case of these tensioning ratchets the direction reversal bars have an identical, in each case circular cross-sectional shape.

The curvature radius of the outer circumferential face of the direction reversal bars coming into contact with the tensioning means and their invariable axial distance to one another are selected in such a way that they define a winding-on shaft with a circular cross section to the extent of the distance existing between the direction reversal bars. The distance of the direction reversal bars is sufficiently great in order to be able to insert an end section of the particular tensioning means there.

As a result of the direction reversal bars being jointly turned about the axis of rotation of the winding-on shaft formed thereby, the end section of the tensioning means inserted between them is pulled along and a multi-layer coil, whose layers lying tightly together due to the tensile forces applied on the tensioning means are held on the winding-on shaft with high surface friction and correspondingly high self-locking, is formed on the winding-on shaft.

To mount the winding-on shaft and at the same time to be able to couple it securely and under uniform loading with the shoulder, in the case of tensioning ratchets of the known type, the console is normally formed in a U-shape with a base from whose ends one side emerges respectively. A circular bearing opening, whose opening radius with slight over dimension is adapted to the curvature radius of the circumferential faces of the direction reversal bars, is formed in the vicinity of the free ends of the sides. The ends of the direction reversal bars of the winding-on shaft lie in the bearing openings with play, so that they can be turned about an axis of rotation running through the midpoint of the bearing openings.

For tautening the tensioning means the known ratchets are equipped with a tensioning lever, which is connected torsionally-fixed to the direction reversal bars and can be pivoted about the axis of rotation of the winding-on shaft. The tensioning lever, moreover, normally comprises at least one ratchet gear wheel, which is mounted concentrically to the axis of rotation of the winding-on shaft and is connected torsionally-fixed to the tensioning lever. The ratchet gear wheel cooperates with a pawl, the so-called "locking slide", mounted on the console, which when the ratchet gear wheel is turned, accompanying the pivoting of the tensioning lever, engages in the gaps existing between the teeth of the ratchet gear wheel and locks the turning position of the winding-on shaft reached in each case.

Since in the tautened condition both the tensioning means coiled up on the tensioning ratchet and the console coupled on the respective shoulder are tightened, the console in the ideal case is held in a line of force running through the shoulder, the axis of rotation of the winding-on shaft and the tensioning means.

For safe retention of the cargo to be secured high tension is normally necessary in the tensioning means. In order to be able to adjust this by means of the tensioning ratchet, the known tensioning ratchets are usually equipped with tensioning levers of considerable length. The ratio of the lever arm length to the radius of the coiled up webbing results in the gearing of the applied force. This force is limited on the one hand by the ability of the user, who through his bodily strength or weight brings the tensioning lever to the required tensioning position. On the other hand, the maximum permitted manual force to be applied by a user is constrained by European Standard EN12195-2.

Attempts have been made through longer tensioning levers or through higher gearing of the leverage forces to further increase the tensioning forces which can be applied by means of a tensioning ratchet, while adhering to the limits mentioned above. In practice, however, it has been shown that the tensioning forces produced in this way lead to such strains on the overall construction that individual parts of the tensioning ratchet are overstressed. A design meeting the requirements regarding constant maximum stress and operating reliability of a tensioning ratchet permitting further increased tensioning forces would entail a no longer manageable weight and dimensions equally hard to handle.

SUMMARY OF THE INVENTION

On the basis of the prior art described above an aspect of the present invention is to create a simple to handle tensioning ratchet, which withstands higher loads and permits pre-tensioning forces to be applied while preventing inadmissible stress on the user.

This aspect is achieved by a tensioning ratchet comprising a console, with a winding-on shaft rotatably mounted in the console, which is formed by at least two direction reversal bars, delimiting a distance between one another, with a tensioning lever for turning the winding-on shaft about an axis of rotation and with a lock mechanism to lock the winding-on shaft in a turning position. In embodiments, the position at least of the outer circumferential face of the direction reversal bars coming into contact with the tensioning means is variable.

In the case of a tensioning ratchet according to the invention the circumferential faces of the direction reversal bars, that is to say the circumferential faces, coming into contact with the tensioning means, which determine the form and expansion of the coil created by the tensioning means on the winding-on shaft, are no longer permanently positioned in regard to each other, but their relative position can be varied for example under the influence of the forces absorbed by the tensioning means or imposed from outside.

In this way on the one hand it is possible that the coil wound around the direction reversal bars receives an optimum compact form, in which the individual winding layers lie tightly together and correspondingly high self-locking forces act between them. On the other hand, the variability of the circumferential faces according to the invention causes uniform loading of the direction reversal bars under the tensioning force. The form and expansion of the eye of the coil formed around the direction reversal bars are determined by the circumferential faces of the direction reversal bars. As a result of the position of the circumferential faces under load being varied, for example being adjusted so that the diameter of the winding eye becomes smaller, uniform loading of the direction reversal bars is achieved. Thus the adjustment of the circumferential faces of the direction reversal bars, occurring automatically with a tensioning ratchet configured according to the invention guarantees that the tensioning force being transmitted rests more evenly distributed on the direction reversal bars than in the case of the prior art. Therefore, the danger no longer exists in the case of a tensioning ratchet according to the invention that only one direction reversal bar is alone stressed to the full, as in the case of the prior art. As a result tensioning ratchets according to the invention can thus be equipped with extended tensioning levers permitting a high tensioning force with the actuating forces remaining within the permitted limits, without an overall reinforced construction of such a tensioning ratchet being necessary for this purpose. Tensioning ratchets configured according to the invention thus make it possible, by selection of more favourable leverage ratios and efficiencies, at the same time with equal actuating forces always complying with the regulations, to exert higher pre-tensioning forces on the tensioning means, than is possible with the prior art.

The variability according to the invention of the circumferential faces in this case can be realized in such a way that a tensioning means, in order to be threaded with its one end section through the area existing in each case between the two or more direction reversal bars, as a consequence of the change in position of the circumferential faces occurring, when the tensioning means is loaded, is held between the direction reversal bars by positive or non-positive locking, so that all direction reversal bars absorb at least part of the load acting overall on the tensioning ratchet and the tensioning means. Likewise, this realization of the variability of the circumferential faces can be used to reduce to a minimum the size of the eye of the tensioning means coil wound around the direction reversal bars. In this way even more uniform distribution of the forces on the direction reversal bars can be successfully achieved with the result that even higher pre-tensioning forces can be produced.

In this case, all tensioning means which in the way described can be wound into a coil whose individual layers can be wound over one another and packed together sufficiently tightly for transmission of force, can be tautened with a ratchet according to the invention. Webbings, extruded straps, ropes and the like have proven especially fit for these purposes. The advantages of a tensioning ratchet according to the invention, however, will become apparent also when chains or comparable tensioning means are tautened.

A first possibility of realizing the variability according to the invention of the circumferential faces consists in the fact that the direction reversal bars are adjustably mounted relative to the axis of rotation of the winding-on shaft in the radial direction for enlarging their axial distance. In the case of this arrangement of the invention the direction reversal bars can be moved for example in guides provided in the console of the tensioning ratchet. For this purpose the end sections of the direction reversal bars can be formed as bearing sections, which engage in corresponding guide grooves or slots. Dependent on the loads and movements of the tensioning ratchet overall or the direction reversal bars themselves occurring in practice, in this case the guide elements concerned have a linear or curved progression, in order to control the automatic movement of the circumferential faces sought by the invention in such a way that optimum uniform loading of the direction reversal bars is achieved in practical use.

Alternatively or in addition to movement taking place in the radial direction the direction reversal bars can be rotatably mounted, for varying the position of their outer circumferential faces coming into contact with the tensioning means, about a pivot axis aligned parallel to their longitudinal direction. The desired uniform load and optimized formation of the coil produced on the winding-on shaft formed by the direction reversal bars in this case can be additionally supported by the fact that the pivot axis of the direction reversal bars is arranged eccentrically relative to the cross section of the direction reversal bars.

One arrangement of the invention which can be manufactured particularly simply and economically is characterized in that the direction reversal bars have a cross-sectional shape approximate to a circle. In this case, simple pins, which are cut to length from rod material, can be used as direction reversal bars.

Improved guiding of the tensioning means on the winding-on shaft and accordingly improved formation of the coil, however, can be achieved if the direction reversal bars have a cross-sectional shape approximate to a circular sector.

The function and uniform loading of the parts of a ratchet according to the invention can be further optimized by the fact that the direction reversal bars have a cross-sectional shape approximate to the shape of a cam. Exactly then, if such cam-shaped direction reversal bars are pivotably arranged about a pivot axis mounted eccentrically to their midpoint, extending parallel to their longitudinal direction, an alignment of the circumferential faces results with particular reliability as regards the loading sought by the invention and leading to uniform loading of the direction reversal bars.

If the direction reversal bars are to be swiveled respectively about their own pivot axis, for this purpose at their lateral ends a bearing section, in each case, can be provided, with which they are respectively mounted in the console. This is particularly expedient if the direction reversal bars outside their bearing sections possess a diameter shape deviating from the circular shape.

A further arrangement of the invention which is particularly advantageous as regards simple manufacture is characterized in that the direction reversal bars consist of several parts. For this purpose according to the invention they can be formed at least from one circumferential face element, which supports the circumferential face coming into contact with the tensioning means, and from a bearing element, by means of and/or about which the change in position of the circumferential face takes place. Optimized weight ratios at the same time with minimized production costs can be achieved due to the fact that the bearing element is a pin mounted at its end sections in the console and the circumferential face element consists of a sheet metal part curved around the pin.

Apart from simplified production variability of the circumferential faces with several degrees of freedom can be made possible with multipart construction of the direction reversal bars. Thus, on the one hand the circumferential face element can be rotatably mounted on the bearing element. At the same time however, the bearing element can move in a guide of the console, in order, for example, to permit a change in position of the outer circumferential faces of the direction reversal bars by varying the axial distance.

A particularly simple way of achieving the rotating drive of the winding-on shaft at the same time with the greatest possible freedom in movement of the outer circumferential faces of the direction reversal bars consists in the fact that the direction reversal bars are jointly fitted in one bearing part, which is rotatably mounted in the console. The bearing part in this case can be used for coupling with the tensioning lever and at the same time can have the guides necessary for adjusting the axial distance and/or the bearings, which are needed for swiveling the direction reversal bars about their respective pivot axis.

Naturally, the above explanations are not restricted to such tensioning ratchets, which only have two direction reversal bars. Thus, the invention is just as effective, if a tensioning ratchet configured according to the invention possesses three or more direction reversal bars. It is only essential that in this case the circumferential faces of the direction reversal bars are variable in the way corresponding to the invention, in order to achieve the uniformity in loading of all direction reversal bars sought and the formation likewise sought of a coil, optimized in shape, on the winding-on shaft formed by the direction reversal bars.

In order to reliably prevent damage to the tensioning means, as a result of the variability according to the invention of the direction reversal surfaces, in accordance with an arrangement of the invention at least one of the direction reversal surfaces is only variable to a limited degree. For this purpose, shoulder can be allocated at least to one of the direction reversal surfaces, which limits the distance over which the direction reversal surface can be varied. As the result of such a shoulder, squeezing or nicking of the tensioning means, particularly in the area existing between the direction reversal bars, is assuredly prevented.

BRIEF DESCRIPTION OF THE DRAWINGS

The invention is described below in detail on the basis of a drawing illustrating an exemplary embodiment. There is shown schematically in each case:

FIG. 4 the console in accordance with FIG. 2 in longitudinal profile in a first operating position;

FIG. 5 the console in accordance with FIG. 2 in longitudinal profile in a second operating position;

DESCRIPTION

Figure 1:
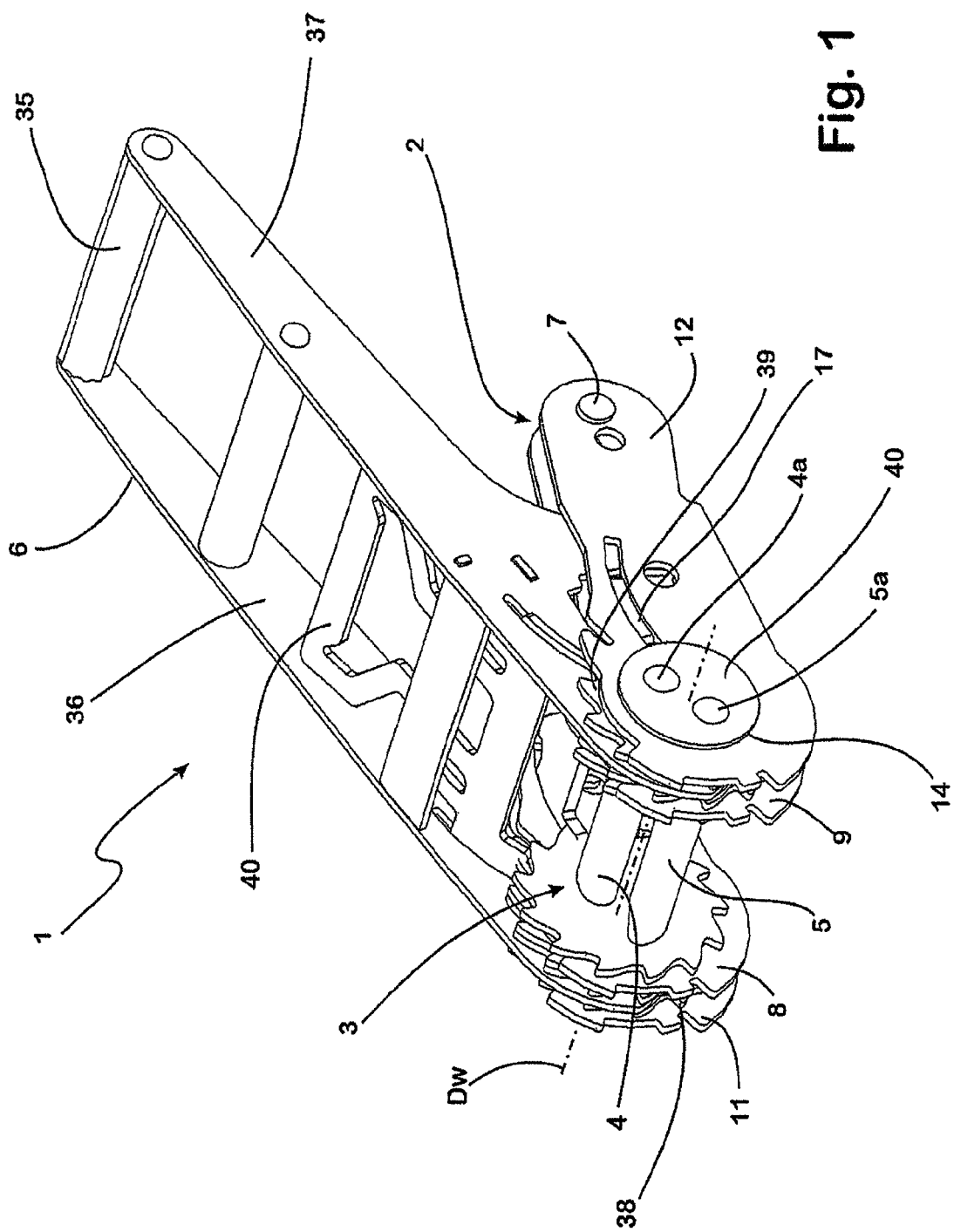
FIG. 1 a tensioning ratchet in perspective view.
Figure 2:
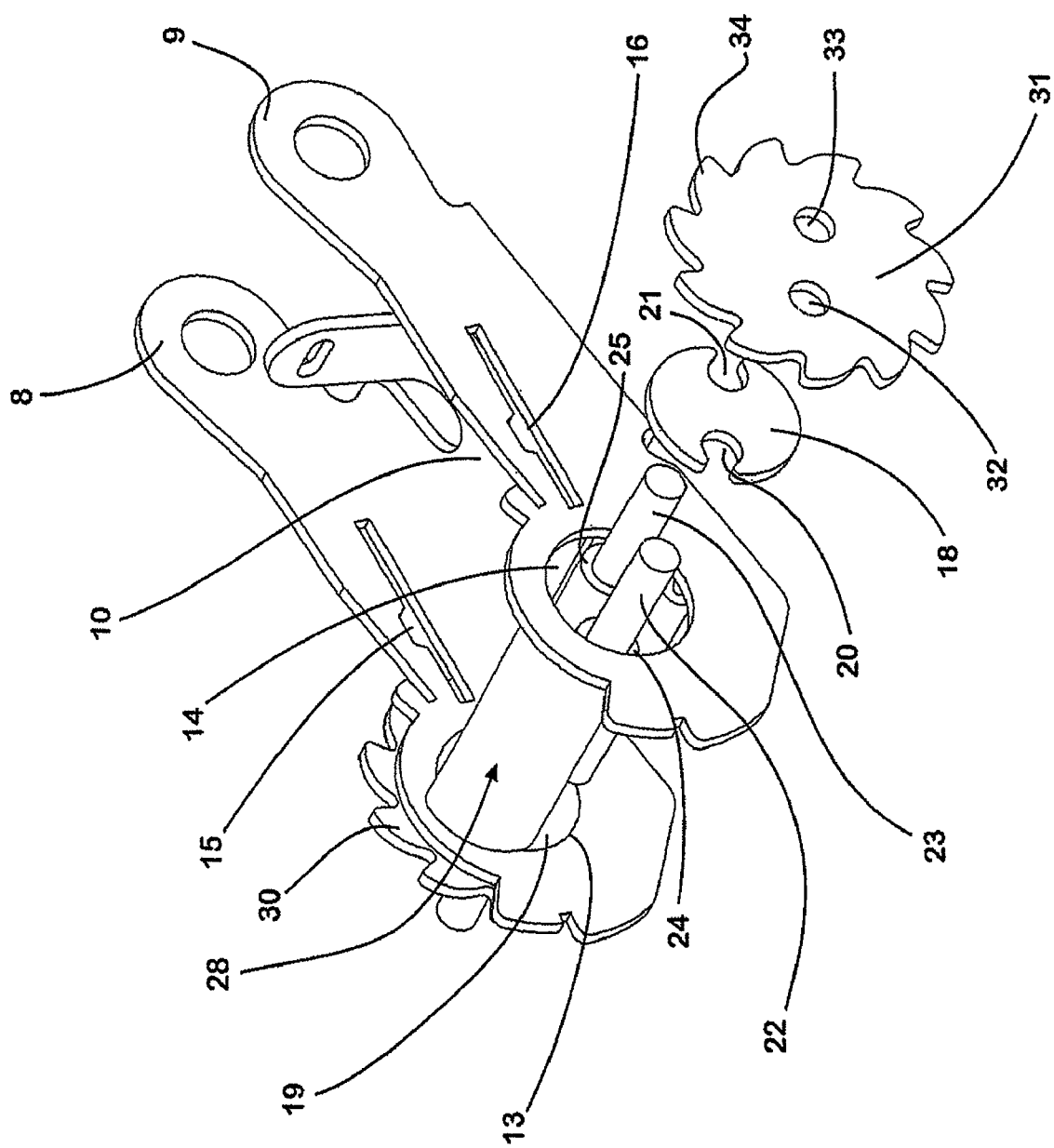
FIG. 2 a console, inserted in the tensioning ratchet in accordance with FIG. 1, with direction reversal bars, bearing part and ratchet gear wheel in an exploded perspective view.
Figure 3:
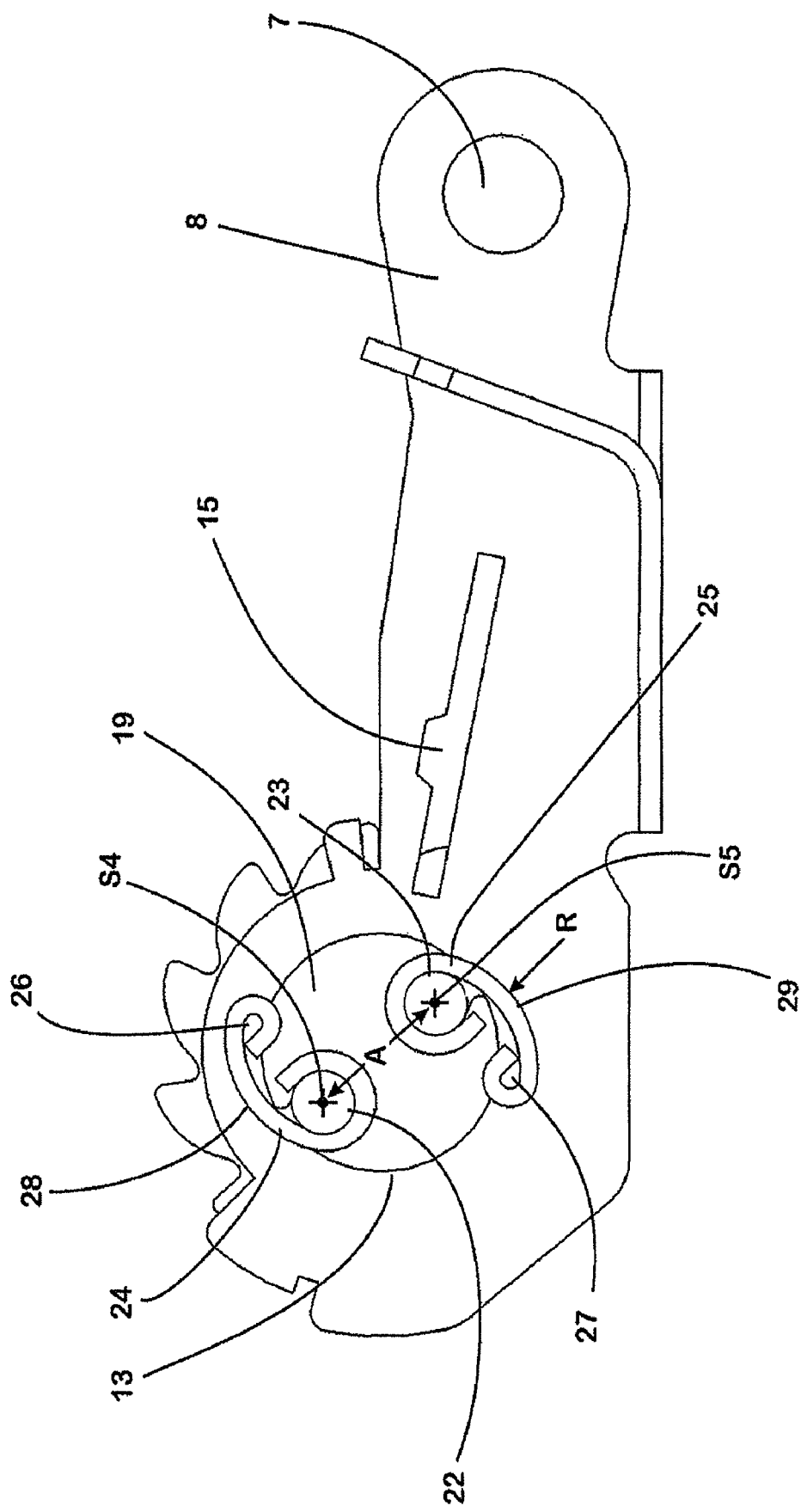
FIG. 3 the console in accordance with FIG. 2 in longitudinal profile.

The tensioning ratchet 1 for tensioning a webbing B has a console 2, a winding-on shaft 3 formed by two direction reversal bars 4, 5 rotatably mounted in the console 2 and a tensioning lever 6 for turning the winding-on shaft 3 about an axis of rotation Dw. Webbing B can be a conventional belt or flat strap manufactured by extrusion for example.

The console 2 has the fundamental shape of a U, whose base is formed with a pin 7, by means of which the tensioning ratchet 1 in practical use is coupled by means of a piece of webbing G with a permanent attachment point, not illustrated here. With its end sections the pin 7 is pressed into a respective opening, which is cut in each case into an inner side plate 8, 9 of the console 2. The inner side plates 8, 9 are connected together by means of a base plate 10 extending between them. On each side of the console 2 an outer side plate 11, 12 arranged at a short distance from the respective inner side plate 8, 9 is pressed through a corresponding opening onto the respective end section of the pin 7.

The inner and outer side plates 8, 9, 11, 12 have an identical shape and are also provided with punchings and recesses identical as regards their position and arrangement. Corresponding to this model in their front free end section a circular bearing opening 13, 14 in each case is cut into the side plates 8, 9, 11, 12. A guide slot 15, 16 is additionally in each case provided in the middle section of the side plates 8, 9, 11, 12 for a locking slide 17, which is tensioned by a spring, not illustrated, towards the front free end of the side plates 8, 9, 11, 12.

A circular disc-shaped bearing part 18, 19, into which two bearing openings 20, 21 are cut respectively, sits freely rotatably with play in the bearing openings 13, 14 respectively. The bearing openings 20, 21 are arranged at the same distance to the midpoint of the respective bearing part 18, 19 on an axis running through the midpoint of the bearing part 18, 19.

The bearing sections 4a, 5a of bearing elements 22, 23, formed in the shape of pins, a part of which is one of the reversing bars 4, 5 in each case, are rotatably mounted in the bearing openings 20, 21, facing one another, of the bearing parts 18, 19. The direction reversal bars 4, 5 are formed in two pieces and beside their respective bearing element 22, 23 comprise a circumferential face element 24, 25 in each case.

The circumferential face elements 24, 25 are each curved from a metal blank, which is firstly laid around the respective bearing element 22, 23 and afterwards worked to its free end in a curvature with a large radius R, which is bent in a tight turn up 26, 27. In this way the circumferential face elements 24, 25 seen in the cross section have a cam-shape with a thicker section in the region laid around the respective bearing element 22, 23 and a thinner pointed section, formed through the respective turn up 26, 27 in the vicinity of the free end of the circumferential face elements 24, 25. The respective pivot axis S4, S5 of the direction reversal bars 4, 5 is arranged eccentrically to the midpoint of the cross-section of the direction reversal bars 4, 5.

The circumferential face elements 24, 25 are bent so tightly around the bearing element 22, 23 each assigned thereto, that they are non-positively locked with it. Their width corresponds with a slight under-dimension to the clear width existing between the inner side plates 8, 9. In this way direction reversal bars 4, 5, formed in each case by one of the bearing elements 22, 23 and by one of the circumferential face elements 24, 25, can be swiveled about a pivot axis S4, S5 running coaxially to the longitudinal direction of the bearing elements 22, 23.

The diameter size and cross-sectional shape of the winding-on shaft 3 is determined by the position and shape of the outer circumferential face 28, 29, curved with the radius R, of the circumferential face elements 24, 25. The circumferential faces 28, 29 of the circumferential face elements 24, 25 thereby form the outer circumferential face, which when the webbing B is wound on the winding-on shaft 3 comes into contact with this webbing B.

The pivot axes S4, S5 are arranged at a distance A parallel to one another, so that a free space is delimited between them, into which an end section of the webbing B can be inserted so that it can be wound on. Should the circumferential faces 28, 29 of the direction reversal bars 4, 5 be varied not only by pivoting about the pivot axes 4a, 5a, but also by changing the distance A through shifting the pivot axes S4, S5 in the radial direction, for this purpose the bearing openings 20, 21 of the bearing parts 18, 19 can be formed in a way, not illustrated here, in the nature of guide slots.

The length of the bearing sections 4a, 5a of the direction reversal bars 4, 5 is limited so that the bearing sections 4a, 5a protrude outwards past the bearing parts 18, 19 and the respective side plate 8, 9. On each exterior of the side plates 8, 9 a ratchet gear wheel 30, 31 is pushed onto the bearing sections 4a, 5a of the direction reversal bars 4, 5 protruding past the bearing parts 18, 19. Each of the ratchet gear wheels 30, 31 for this purpose has two openings 32, 33 adapted to the position and size of the bearing sections 4a, 5a of the direction reversal bars 4, 5. The ratchet gear wheels 30, 31 are toothed in the known way so that under load their teeth 34 with their steep 14 flank contact the edge of the transport slide 17 engaging in the gap between the teeth 34, and the turning position of the winding-on shaft 3 is locked, while they are pushed with their rounded flank past the edge concerned of the transport slide 17, when the winding-on shaft 3 is turned in the coiling direction.

The tensioning lever 6 likewise possesses the fundamental shape of a U, whose base is formed by a hand rod 35, onto which the lateral side plates 36, 37 adjoin. The length L of the side plates 36, 37 is approximately twice the length of the inner and outer side plates 8, 9, 11, 12 of the console 2. At their free ends the side plates 36, 37 of the tensioning lever 6 in each case have two bearing openings, not illustrated here, adapted as regards their size, shape and position, to the bearing parts 18, 19, by means of which the tensioning lever 6 is freely rotatably mounted on the bearing parts 18, 19.

In each case, a further ratchet gear wheel 38, 39, which is configured exactly like the ratchet gear wheels 30, 31 respectively, is pushed at each side additionally outwards onto the bearing sections 4a, 5a of the direction reversing bars 4, 5. The respective outer side plate 11, 12 forms the outer lateral termination of the structure of the console 2, in whose bearing opening 14 a corresponding circular disc-shaped bearing part 40 corresponding to the bearing parts 18, 19 respectively is rotatably mounted and in whose bearing openings the ends of the bearing sections 4a, 5a of the direction reversal bars 4, 5 sit.

The tensioning lever 6 is equipped with a pawl 41, which is held by means of a spring, not illustrated, in a pull along position, whereby its locking edge engages in spaces existing between the teeth 34 of the ratchet gear wheels 30, 31, 38, 39.

Figure 6:
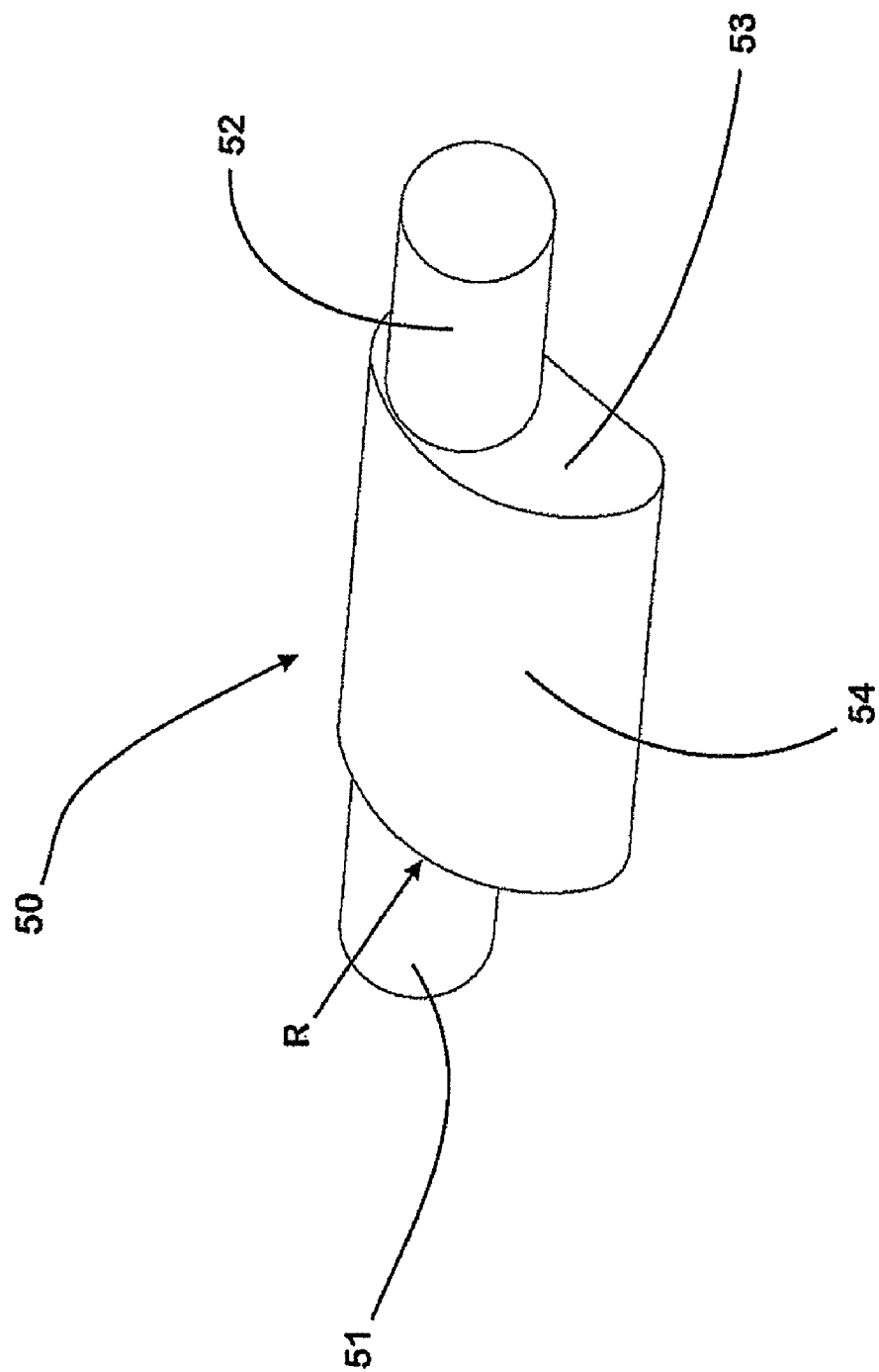
FIG. 6 an alternative direction reversal bar in perspective view.

As an alternative to the multipart arrangement described above the direction reversal bars 4, 5 can also be moulded integrally from the whole. A direction reversal bar 50, formed accordingly, is illustrated in FIG. 6. Such a direction reversal bar 50 can be produced, for example, by a metal cutting process. In this case, the direction reversal bar 50 has a middle section 51, which likewise possesses a cross-sectional shape approximate to a camshape. Integrally adjoined thereto are bearing sections 52, 53, aligned offset to the cross section middle by which the pivotable mounting of the direction reversal bar 50 is effected in the same way as the bearing of the direction reversal bars 4, 5 by means of their bearing sections 4a, 5a. The circumferential face 54 of the direction reversal bar 50 coming into contact with the webbing B in practical use is defined by the exterior face of the middle section 51 of the direction reversal bar 50 curved with a large radius R.

In order to tauten the webbing B its end is threaded through the area delimited between the direction reversal bars 4, 5 and laid once around the winding-on shaft 3, so that the outer circumferential faces 28, 29 of the direction reversal bars 4, 5 are covered by the webbing B. Subsequently, the winding-on shaft 3 is turned about its axis of rotation Dw by repeated lifting and lowering of the tensioning lever 6, so that a multilayer coil W forms on the winding-on shaft 3. In the course of this winding operation the webbing B becomes tighter and tighter so that also the windings of the coil W are pulled together more and more strongly and closely. As a consequence of these loads becoming stronger the direction reversal bars rotatably mounted by means of their bearing elements 22, 23 align themselves with their circumferential face elements 24, 25, according to their alignment relative to the line of dynamic effect, so that the outer circumferential faces 28, 29 of the direction reversal elements 4, 5 coming into contact with the webbing B and directly loaded by the tensioning forces, align themselves according to the respective load. As a consequence of which the coil W develops a tightly packed form, by which it is guaranteed that the direction reversal bars 4, 5 are uniformly loaded by the tensioning forces overall bearing on the winding-on shaft 3. As a result therefore, high tensioning forces can be applied on the webbing B by means of a considerably extended tensioning lever 6, without the user having to apply excessively large forces and without the individual parts of the tensioning ratchet 1 being overstressed.

REFERENCE SYMBOLS

1 Tensioning ratchet
2 Console
3 Winding-on shaft
4, 5 Direction reversal bars
4a, 5a Bearing sections of the direction reversal bars 4,5
6 Tensioning lever
7 Pin
8, 9 Inner side plates of the console 2
10 Base plate
11,12 Outer side plates of the console 2
13, 14 Bearing openings of the side plates 8, 9, 11, 12
15, 16 Guide slot
17 Transport slide
18, 19 Bearing parts
20, 21 Bearing openings
22, 23 Bearing elements
24, 25 Circumferential face elements
26, 27 Turn up
28, 29 Circumferential face of the circumferential face elements 24, 25
30, 31 Ratchet gear wheels
32, 33 Openings of the ratchet gear wheels 30, 31
34 Teeth of the ratchet gear wheels 30, 31
35 Hand bar 36, 37 Side plates of the tensioning lever 6
38, 39 Ratchet gear wheels
40 Bearing part
41 Pawl
50 Direction reversal bar
51 Middle section of the direction reversal bar 50
52, 53 Bearing sections of the 50 direction reversal bar 50
54 Circumferential face of the direction reversal bar 50
A Distance between the direction reversal bars 4, 5
B Webbing
Dw Axis of rotation
G Piece of webbing
R Curvature radius of the circumferential faces 28, 29
S4, S5 Pivot axis of the direction reversal bars 4, 5
W Coil

The invention claimed is:

1. Tensioning ratchet for tautening and holding tensioning means comprising a console, with a winding-on shaft rotatably mounted in the console, which is formed by at least two direction reversal bars, delimiting a distance between one another, and with a tensioning lever for turning the winding-on shaft about an axis of rotation, wherein a relative position at least of an outer circumferential face of the direction reversal bars, coming into contact with the tensioning means can change under the influence of forces absorbed by the tensioning means or imposed from outside.

2. Tensioning ratchet according to claim 1, wherein the direction reversal bars are adjustably mounted relative to the axis of rotation in the radial direction for enlarging their axial distance.

3. Tensioning ratchet according to claim 2, wherein the direction reversal bars at their lateral ends move in a guide.

4. Tensioning ratchet according to claim 3, wherein the guide defines a curved track.

5. Tensioning ratchet according to claim 1, wherein the direction reversal bars are rotatably mounted about a pivot axis, aligned parallel to their longitudinal axis.

6. Tensioning ratchet according to claim 5, wherein the pivot axis of the direction reversal bars is arranged eccentrically to the cross section of the direction reversal bars.

7. Tensioning ratchet according to claim 1, wherein the direction reversal bars have a cross-sectional shape approximate to a circle.

8. Tensioning ratchet according to claim 1, wherein the direction reversal bars have a cross-sectional shape approximate to a circular sector.

9. Tensioning ratchet according to claim 1, wherein the direction reversal bars have a cross-sectional shape approximate to the shape of a cam.

10. Tensioning ratchet according to claim 1, wherein the direction reversal bars at their lateral ends have a bearing section in each case, with which they are mounted in the console.

11. Tensioning ratchet according to claim 10, wherein the direction reversal bars are variably mounted in the console by means of their bearing sections.

12. Tensioning ratchet according to claim 1, wherein the direction reversal bars are formed at least from a circumferential face element, which supports the circumferential face, coming into contact with the tensioning means, and from a bearing element, by means of which and/or about which the change in position of the circumferential face takes place.

13. Tensioning ratchet according to claim 12, wherein the bearing element is a pin mounted with its bearing sections in the console and the circumferential face element comprises a sheet metal part curved around the pin.

14. Tensioning ratchet according to claim 13, wherein the circumferential face element is rotatably mounted on the bearing element.

15. Tensioning ratchet according to claim 12, wherein the circumferential face element is rotatably mounted on the bearing element.

16. Tensioning ratchet according to claim 1, wherein the direction reversal bars are jointly fitted in one bearing part, which is rotatably mounted in the console.

17. Tensioning ratchet according to claim 1, wherein a lock mechanism is provided to lock the winding-on shaft in a turning position.

18. Tensioning ratchet according to claim 1, wherein a shoulder is allocated at least to one of the direction reversal surfaces, which limits the distance over which the direction reversal surface can be varied.

19. Tensioning ratchet according to claim 1, wherein the tautening and holding tensioning means comprise webbings, extruded straps, ropes, or chains.

* * * * *